(12) United States Patent
Cooper et al.

(10) Patent No.: US 8,362,919 B2
(45) Date of Patent: Jan. 29, 2013

(54) SENSOR AND TRANSMITTER SYSTEM FOR COMMUNICATION IN PIPELINES

(75) Inventors: John F. Cooper, Oakland, CA (US); Alan K. Burnham, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 13/165,360

(22) Filed: Jun. 21, 2011

(65) Prior Publication Data

US 2011/0247416 A1    Oct. 13, 2011

Related U.S. Application Data

(62) Division of application No. 10/854,068, filed on May 26, 2004, now abandoned.

(60) Provisional application No. 60/485,464, filed on Jul. 8, 2003.

(51) Int. Cl.
*H04Q 9/00*       (2006.01)

(52) U.S. Cl. ............... 340/870.07; 73/19.1; 340/539.14; 340/870.16; 205/781; 205/788; 205/779; 702/19; 436/43; 436/52; 436/125

(58) Field of Classification Search .................. 73/19.1; 340/539.14, 870.01, 870.07, 870.16; 205/781, 205/788, 779; 436/125, 43, 52, 104; 702/19
See application file for complete search history.

(56) References Cited

U.S. PATENT DOCUMENTS

| | | | |
|---|---|---|---|
| 5,416,724 A | 5/1995 | Savic | |
| 5,623,421 A | 4/1997 | Savic | |
| 5,708,195 A | 1/1998 | Kurisu et al. | |
| 5,757,664 A | 5/1998 | Rogers et al. | |
| 6,082,193 A | 7/2000 | Paulson | |
| 6,290,908 B1 * | 9/2001 | Fukunaga et al. | 422/68.1 |
| 6,389,881 B1 | 5/2002 | Yang et al. | |
| 6,626,042 B2 * | 9/2003 | Havlena | 73/702 |
| 6,919,803 B2 * | 7/2005 | Breed | 340/539.14 |
| 2002/0189362 A1 | 12/2002 | Havlena | |
| 2002/0189367 A1 | 12/2002 | Gomm et al. | |
| 2003/0138053 A1 | 7/2003 | Candy et al. | |

FOREIGN PATENT DOCUMENTS

| | | |
|---|---|---|
| DE | 40 37 600 A1 | 6/1992 |
| WO | WO 02103303 A1 | 12/2002 |

* cited by examiner

*Primary Examiner* — Albert Wong
(74) *Attorney, Agent, or Firm* — Eddie .E. Scott

(57) ABSTRACT

A system for sensing and communicating in a pipeline that contains a fluid. An acoustic signal containing information about a property of the fluid is produced in the pipeline. The signal is transmitted through the pipeline. The signal is received with the information and used by a control.

7 Claims, 6 Drawing Sheets

SENSOR AND TRANSMITTER SYSTEM FOR COMMUNICATION IN PIPELINES

CROSS-REFERENCE TO RELATED APPLICATIONS

The present application is a divisional of co-pending U.S. application Ser. No. 10/854,068, filed May 26, 2004, entitled "SENSOR AND TRANSMITTER SYSTEM FOR COMMUNICATION IN PIPELINES", which is a non-provisional application of U.S. Provisional Application No. 60/485,464, filed Jul. 8, 2003, entitled "EXTENSIONS OF SENSOR/TRANSMITTER TECHNOLOGY", now expired, the entire contents and disclosures of which are both specifically incorporated by reference herein.

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

1. Field of Endeavor

The present invention relates to communication systems, and more particularly to a system for communication in pipelines.

2. State of Technology

U.S. Pat. No. 6,082,193 for a pipeline-monitoring array, issued Jul. 4, 2000, provides the following state of technology information, "a cable is deployed in the pipeline, with at least one acoustic sensor attached. The acoustic sensor is selected to detect acoustic emissions in the fluid in which it is put. The acoustic emissions are those generated by an acoustic event in a pipeline such as emissions produced by a wire break or a high-pressure leak. In a preferred embodiment, the sensor is a hydrophone."

United States Patent Application No. 2002/0189362 by Vladimir Havlena for communication for water distribution networks, published Dec. 19, 2002, provides the following state of technology information, "Control of processes is a broad general concern for every industry, particularly where fluids such as water are distributed in a network of pipes, vessels, containers and tanks. Often it is necessary to know conditions at various remote locations in a process in order to control the overall operation effectiveness and efficiency of production. One particular industry that requires significant control and which presently does not have adequate abilities for this goal is the water distribution networks that bring potable water from water supply sources and water treatment plants providing these water supply sources. It is well recognized that interruption of fluid flow in systems such as water supply systems needs to be minimized to identify and repair any interruption, such as by a pipe rupture or puncture, or by blockage of the line of flow."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a system for sensing and communicating in a pipeline. A sensor obtains information about the fluid in the pipeline. The information relates to at least one property of the fluid comprising a biological property or a chemical property or a temperature property or a density property or a thermal conductivity property or an electrical resistivity property or a sound property or a speed property or a viscosity property or an optical property of the fluid. An acoustic signal containing information is produced in the pipeline. The signal is transmitted through the pipeline. The signal is received with the information and used to perform a desired operation.

In one embodiment, a sensor is connected to the pipeline that senses properties of the fluid and produces a signal in the pipeline. A receiver is connected to the pipeline for receiving the signal. A central control unit communicates with the receiver and the sensor communicates with the central control unit through the receiver. In one embodiment, an ultrasonic signal is produced in the pipeline. In one embodiment, the acoustic signal is produced by an acoustic signal generator. In another embodiment, the acoustic signal is produced by a pinger. In one embodiment, the acoustic signal is produced by a digital pulse generator. In one embodiment, the acoustic signal is produced by a binary pulse generator. In one embodiment, the acoustic signal is produced by an acoustic signal generator that is an octal pulse generator. In one embodiment, the acoustic signal is produced by an acoustic signal generator that is amplitude modulated. In one embodiment, the acoustic signal is produced by an acoustic signal generator that is frequency modulated. In one embodiment, the numerical value of information is related to the time between said pulses.

In one embodiment, the sensor is a pair of electrodes. In another embodiment, the sensor contains a reference electrode. In another embodiment, the sensor contains a Pt, Au, Ag, Ni, Co, Cu, Ti, or other transition metal electrode. In another embodiment, the sensor contains an oxidation/reduction potential (ORP) measuring electrode. In another embodiment, the sensor contains an oxidation/reduction potential (ORP) measuring electrode and the ORP is cleaned by imposition of a cathodic or anodic current to remove biofouling or mineral deposits. In one embodiment, a cathodic current removes mineral deposits. In another embodiment, an anodic current removes mineral deposits.

One embodiment includes a central control unit and the sensor communicates with the central control unit for quality assurance and process control feedback. In one embodiment, power is supplied to the receiver by an internal battery, fuel cell, hydraulic electric generator, or thermoelectric generator. In another embodiment, power is supplied to the sensor by an internal battery, fuel cell, hydraulic electric generator, or thermoelectric generator.

In one embodiment, the sensor is introduced into the pipe by a robot. In another embodiment, the sensor is introduced into the pipe by a robot and fixed to the inside of the pipe by a mechanical fastener installed by the robot. In another embodiment, the sensor is introduced into the pipe by a robot and fixed to the inside of the pipe by an adhesive material installed by the robot. In another embodiment, the sensor is introduced into the pipe through a threaded hole in the pipe. In another embodiment, the sensor is introduced into the pipe through a fire hydrant. In another embodiment, the sensor is introduced into the pipe through a fire hydrant with a tether comprised of a flattened tape of metal, a steel cable, or a polymer cable.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
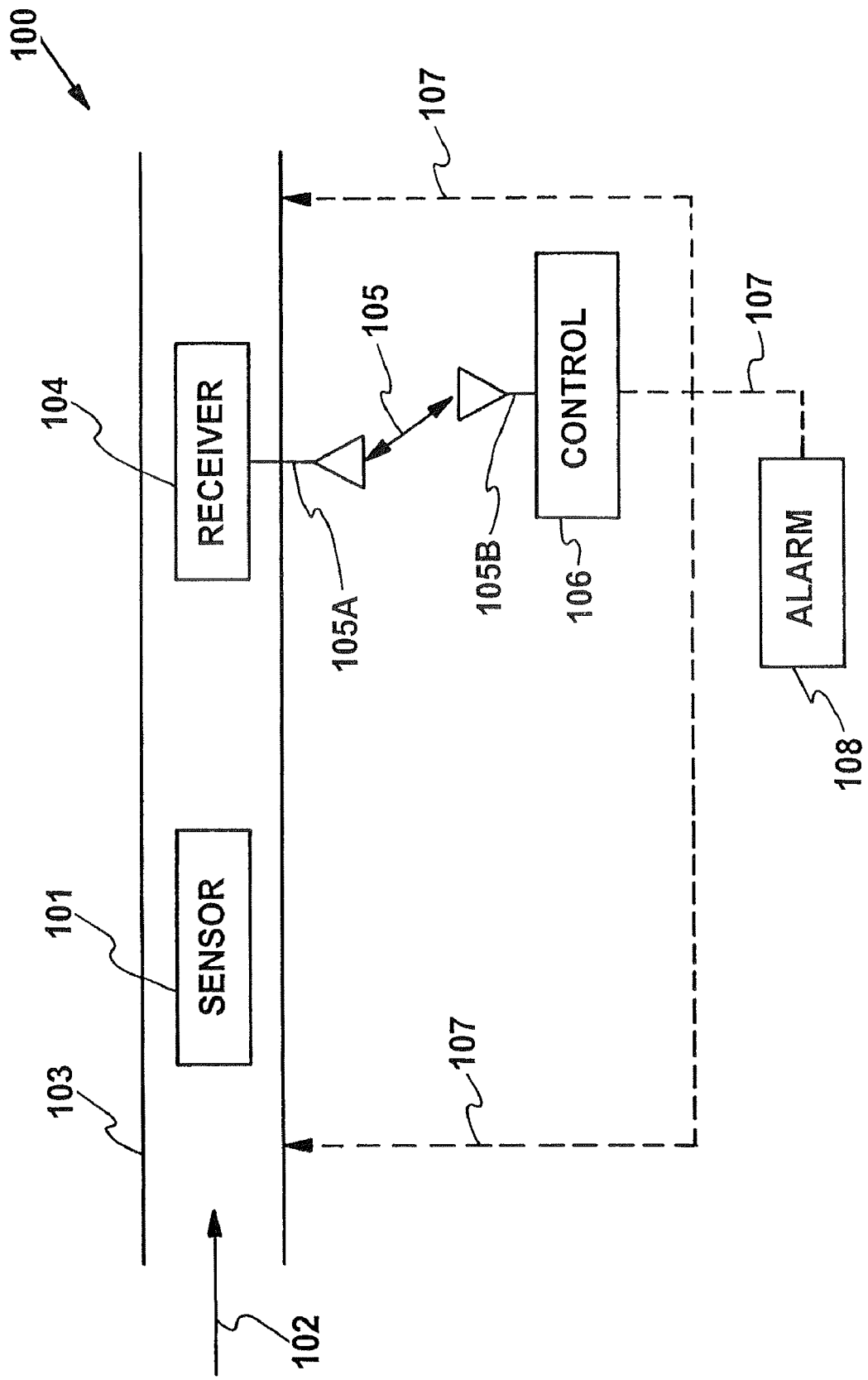
FIG. 1 illustrates an embodiment of a system constructed in accordance with the present invention.

Referring now to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring now to FIG. 1, an embodiment of a system constructed in accordance with the present invention is illustrated. The system is designated generally by the reference numeral 100. The system 100 provides communication using a sensor 101, a receiver 104, and a control 106 in any pipe network 103 that contains a fluid 102. The fluid 102 can be water, oil, gas, an aqueous solution, or a chemical mixture. Examples of pipe networks that the system 100 can be used with include oil and gas collection and distribution pipelines, chemical processing units, and cooling water systems. Examples of the sensors used by the system 100 include sensors that obtain information about a property of the fluid 102. The property can be a biological property or a chemical property or a temperature property or a density property or a thermal conductivity property or an electrical resistivity property or a sound property or a speed property or a viscosity property or an optical property.

The system 100 also utilizes installation methods such as insertion through a fire hydrant, use of a conventional hot-tap saddle with an interlock volume on an exposed pipe, and use of the Bernoulli effect to draw liquid to a sensor outside the pipe.

In one embodiment of the system 100, the sensor 101 utilizes a pair of electrodes. In another embodiment of the system 100, the sensor 101 utilizes a reference electrode. In another embodiment of the system 100, the sensor 101 utilizes a Pt, Au, Ag, Ni, Co, Cu, Ti, or other transition metal electrode. In another embodiment of the system 100, the sensor 101 utilizes an oxidation/reduction potential (ORP) measuring electrode. In another embodiment of the system 100, the sensor 101 utilizes an oxidation/reduction potential (ORP) measuring electrode and the ORP is cleaned by imposition of a cathodic or anodic current to remove biofouling or mineral deposits. In one embodiment a cathodic current removes mineral deposits. In another embodiment an anodic current removes mineral deposits.

The system 100 utilizes sensor 101 that is exposed to fluid 102 in the pipe 103. The sensor 101 communicates with receiver 104. The receiver 104 communicates by communication system 105 to control 106. The control 105 can take appropriate action in response to the information obtained by the sensor 101. The control can be connected to various locations along the pipeline 103 by the connection 107. The control can also be connected to an alarm 108 by connection 107.

A system of communication for water distribution networks is shown in United States Patent Application No. 2002/0189362 published Dec. 19, 2002 and International Patent Application No. WO 02/103303 published Dec. 27, 2002. Both patent applications are owned by Honeywell International Inc. and were invented by Vladimar Havlena. The disclosures of United States Patent Application No. 2002/0189362 and International Patent Application No. WO 02/103303 are incorporated herein by this reference.

The systems described in United States Patent Application No. 2002/0189362 is the following, "A pressure sensor 13 measures the pressure at a specific location 15, and generates a signal in response to that pressure to an acoustic transmitter 17. Transmitter 17 then transmits an acoustic signal along pipe 11 to an acoustic receiver 19, which in turn converts the sound wave into information about the remote pressure 21 that is used by the master pressure controller 25 to define the setpoint for the slave controller that controls the pressure-reducing valve 23. Internally, the pressure controller receives the measured, compares with setpoint for the remote pressure, and defines the outlet pressure for the pressure-reducing valve 23 to reduce the difference between the measured pressure and its set point. The slave controller compares the measured outlet pressure at the pressure reduce valve 23 outlet with the set point and open/close the valve to follow this set point. For reliable communication between sensor 13 and valve 23, only plane sound waves are propagated in pipe 11. A transverse wave is excited for a wavelength less than 1.7 times the diameter. Therefore, for a typical pipeline diameter D between 0.08 and 0.3 meters, the maximum frequency is 11 to 3 kHz." The system described in International Patent Application No. WO 02/103303 is identical.

In the system 100, the communication system 105 provides a wired or wireless connection to control 106. The receiver 104 includes a wireless transmission unit 105. The control 106 includes a wired or wireless receiver 105B. In one embodiment the wireless transmission unit 105 and the wireless receiver 105B are radio units. In another embodiment the wireless transmission unit 105 and the wireless receiver 105B are cell phone units. The control is connected to the pipeline 303 by connection 107. The control 106 can take appropriate action in response to the information obtained by the sensor 101 and transferred to the control 106 via wireless transmission unit 105.

In one embodiment of the system 100 that provides communication using a network of sensors 101 to a control to any pipe network that distributes a fluid the sensor, 101 is a sensor that produces an ultrasonic signal in the fluid 102 in the pipe 103. In another embodiment the sensor 101 is acoustic signal generator that produces an acoustic signal in the fluid 102 in the pipe 103. In another embodiment the sensor 101 is a pinger that produces an acoustic signal in the fluid 102 in the pipe 103. In another embodiment the sensor 101 is a digital pulse generator that produces a digital pulse signal in the fluid 102 in the pipe 103. In another embodiment the sensor 101 is a binary pulse generator that produces a binary pulse signal in the fluid 102 in the pipe 103. In another embodiment the sensor 101 is an octal pulse generator that produces an octal pulse signal in the fluid 102 in the pipe 103. In another embodiment the sensor 101 is an acoustic signal generator that is amplitude modulated. In another embodiment the sensor 101 is an acoustic signal generator that is frequency modulated. In one embodiment the sensor 101 produces acoustic pulses and numerical value of information transmitted is related to the time between the acoustic pulses. In one embodiment the fluid is circulated from the pipe 103 by a tube protruding into the fluid utilizing the Bernoulli effect.

In one embodiment, the sensor 101 senses physical properties of the fluid. In another embodiment, the sensor 101 senses temperature or density or thermal conductivity or electrical resistivity or sound speed or sound absorption or viscosity or magnetic susceptibility or magnetic moment relaxation of the fluid. In another embodiment, the sensor 101 senses turbidity or opacity or light absorption or light rotation or light scattering or absorption on a surface. In another embodiment, the sensor 101 senses chemical properties of the fluid. In another embodiment, the sensor 101 senses specific ion concentration or specific molecular composition of the fluid.

In another embodiment, the sensor 101 senses biological, biochemical or chemical contaminants in the fluid. In another embodiment, the sensor 101 senses biochemicals or sporulated bacteria or viral organisms or microbial organisms in the fluid. In another embodiment, the sensor 101 senses elemental chlorine or oxidative oxy-halogen compounds or ozone or oxygen or peroxydisulfate or strong reducing agents or hyposulfite or thiosulfate or sulfide or $H_2S$ or cyanide or selenium or lead sensor or mercury or arsenic or nerve agents or blistering or Lewisite or G-agents or phosgene or gas or actinides or radioactive isotopes or radioactive iodine or radioactive cesium or radioactive strontium sensor or thorium or radioactive cobalt or radioactive thorium in the fluid.

The central control unit 106 is connected to the receiver 104 by a radio control system 105 and the sensor 110 communicates with the central control unit for quality assurance and process control feedback. Power is supplied to the receiver 104 by an internal battery, fuel cell, hydraulic electric generator, or thermoelectric generator. Power is supplied to the sensor 101 by an internal battery, fuel cell, hydraulic electric generator, or thermoelectric generator.

Figure 2:
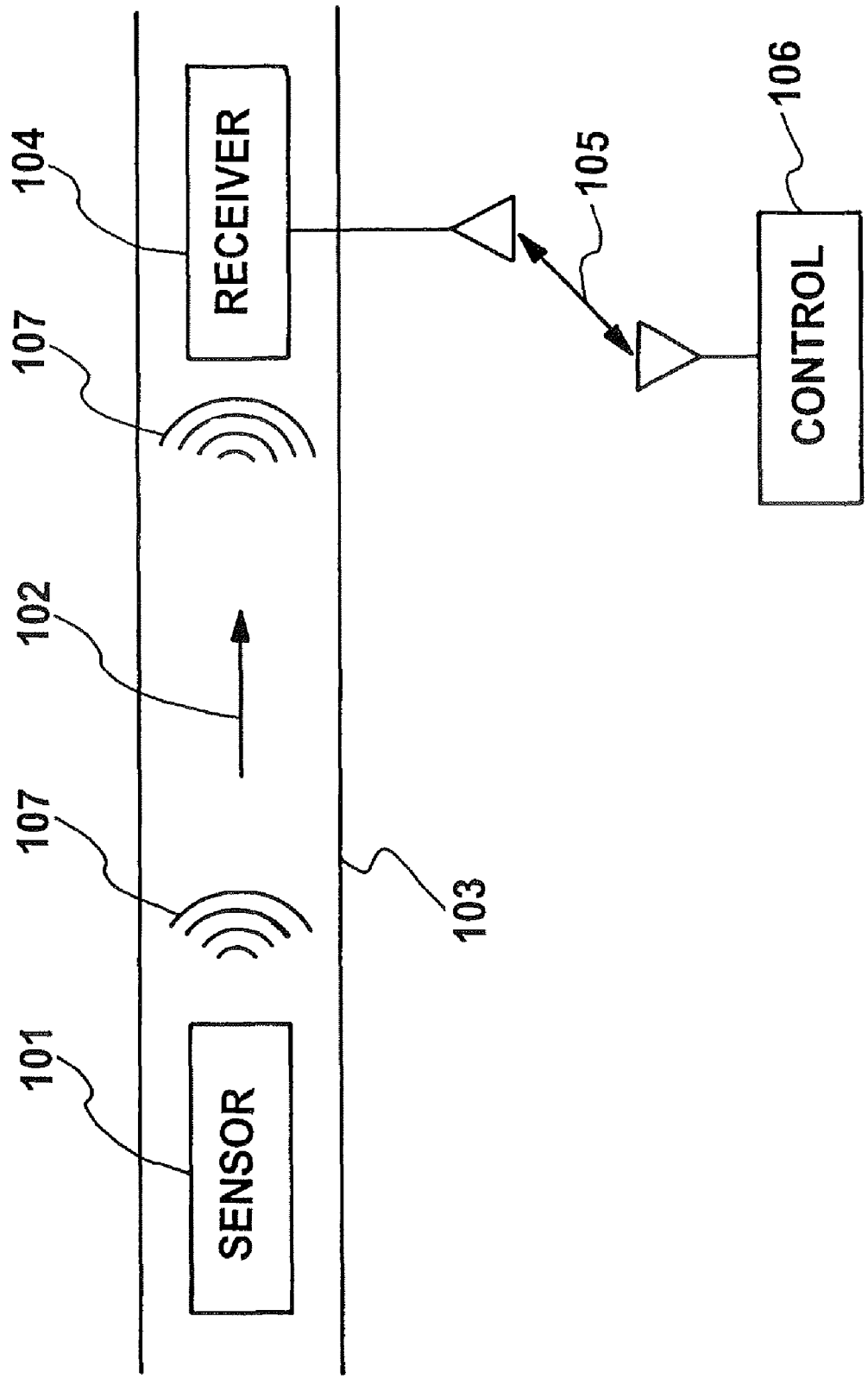
FIG. 2 illustrates additional details of the communication system.

Referring now to FIG. 2, additional details of the communication system 100 are illustrated. The communication system 100 uses acoustic signal bursts 107 in the fluid 102. The communication system 100 can be used in any pipe network that distributes a fluid. Examples of pipe networks that the system 100 can be used in include oil and gas collection and distribution pipelines, chemical processing units, and cooling water systems. The system 100 transmits a signal 107 through the fluid 102 in the pipe 103.

The sensor 101 obtains information about a property of the fluid 102. The property can be a biological property or a chemical property or a temperature property or a density property or a thermal conductivity property or a resistivity property or a sound property or a speed property or a viscosity property or a turbidity property or opacity property or light absorption property or light rotation property or light scattering property or magnetic property or adsorption on a surface property. The sensor 101 in various embodiments senses biochemicals or sporulated bacteria or viral organisms or microbial organisms in the fluid. In another embodiment, the sensor 101 senses elemental chlorine or oxidative oxy-halogen compounds or ozone or oxygen or peroxydisulfate or strong reducing agents or hyposulfite or thiosulfate or sulfide or $H_2S$ or cyanide or selenium or lead sensor or mercury or arsenic or nerve agents or blistering or Lewisite or G-agents or phosgene or gas or actinides or radioactive isotopes or radioactive iodine or radioactive cesium or radioactive strontium sensor or thorium or radioactive cobalt or radioactive thorium in the fluid.

The sensor 101 transmits the signal 107 into the fluid 102 in the pipe 103 where it is available for the receiver 104. The signal 107 in one embodiment is an ultrasound signal above 20,000 hertz. The signal 107 is recovered by receiver and transmitted to the control 106.

The sensor 101 and the receiver 104 can be installed in existing pipes using systems of the present invention. The systems can be use in installing water quality monitoring sensors into buried water pipes. The systems can also be used to install a service connection for any purpose. The systems can be used to install connections in any buried fluid distribution system with minimal excavation.

The central control unit 106 is connected to the receiver 104 by a radio control system 105 and the sensor 110 communicates with the central control unit for quality assurance and process control feedback. Each system is wireless and autonomous, being powered by a primary battery, micro fuel cell, or a secondary battery trickle charged by a thermoelectric device, solar cell, or a water-powered generator. Power is supplied to the receiver 104 by an internal battery or fuel cell. Power is supplied to the sensor 101 by an internal battery or fuel cell.

Figure 3:
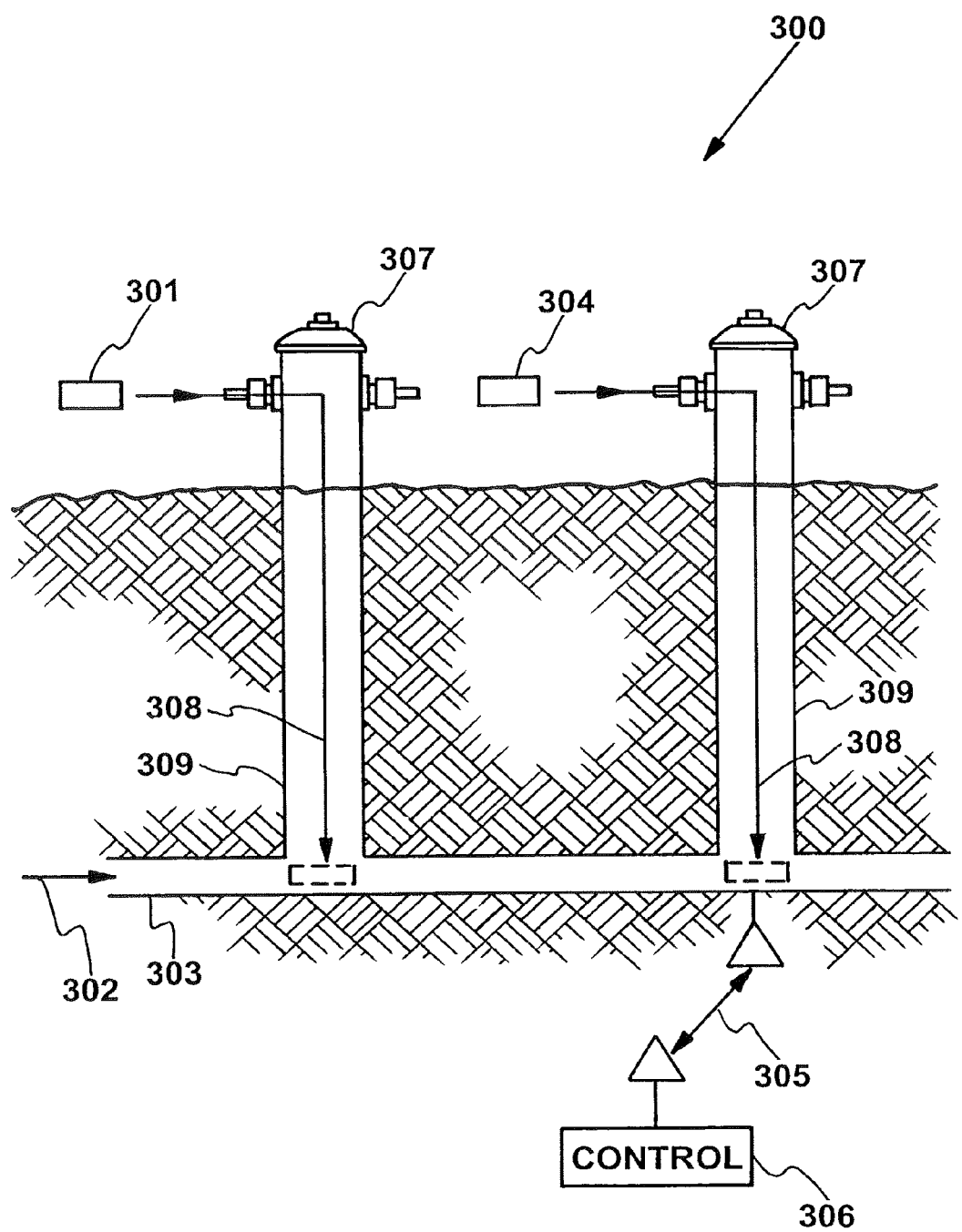
FIG. 3 illustrates an embodiment an embodiment of a system for introducing a warning unit such as sensor or a receiver into the pipe through a fire hydrant.

Referring now to FIG. 3, an embodiment of a system for introducing a warning unit such as sensor 301 or a receiver 304 into the pipe 303 through a fire hydrant 307 is illustrated. The system is designated generally by the reference numeral 300. The system 300 provides an inexpensive method of installing a warning unit such as water monitoring sensors, transmitters, or receivers into a water distribution network.

The system 300 uses existing water distribution networks and enables a warning unit such as sensor/transmitter 310 or receiver 304 to be installed into a buried pipe 303 without excavation. The system 300 can be used in installing water quality monitoring sensors and receiver into buried water pipes. The system 300 can also be used as a service connection for any purpose. The system 300 can be used to install connections in any buried fluid distribution system without excavation.

The system 300 utilizes sensor 301 that is exposed to fluid 302 in a pipe 303. The sensor 301 communicates with receiver 304. The receiver 304 communicates by communication system 305 to control 306. The control 306 can take appropriate action in response to the information obtained by the sensor 301.

The fire hydrants 307 are connected to the pipe 303 through standard connections 309. The sensor 301 and receiver 304 are introduced into the pipe 303 through the fire hydrants 307 and connections 309 with a tether 308. The tether 308 can be a flattened tape of metal, a steel cable, a polymer cable or other type of tether. Power is provided to the sensor 301 and receiver by internal batteries or fuel cells.

The system 300 can be used as a service connection for any purpose. The system 300 can be used for installing sensors and receiver into buried water pipes. In one embodiment the sensor 301 and receiver 304 are introduced into a pipeline network by a robot and fixed to the inside of the pipe 303 by a mechanical fastener installed by the robot. In another embodiment the sensor 301 and receiver 304 are introduced into the pipeline network by a robot and fixed to the inside of the pipe 303 by an adhesive material installed by the robot. In another embodiment the sensor 301 and receiver 304 are emplaced into a threaded hole in the water pipe.

Figure 4:
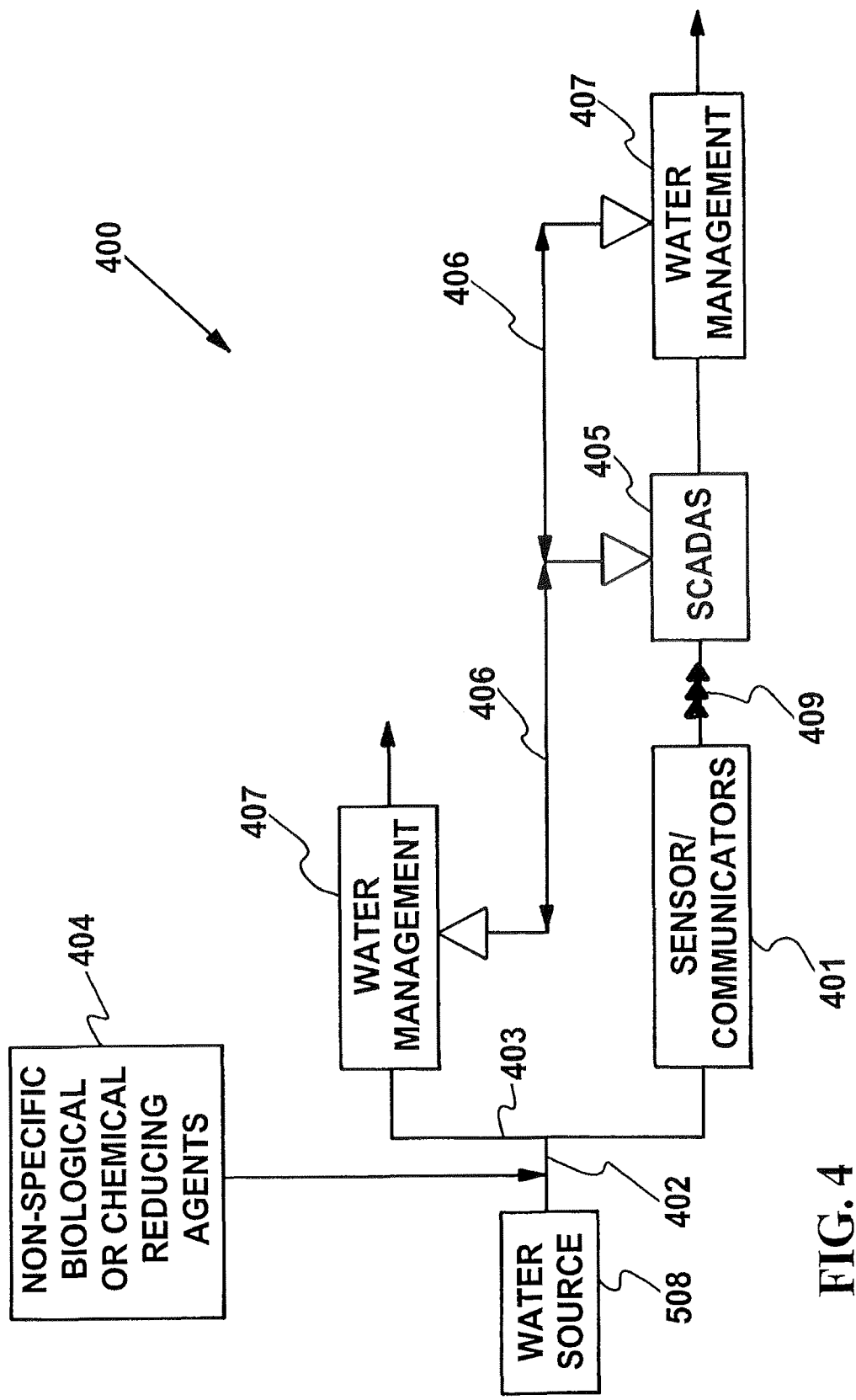
FIG. 4 illustrates a system that provides early warning of contamination of a water distribution system.

Referring now to FIG. 4, another embodiment of a system constructed in accordance with the present invention is illustrated. The system is designated generally by the reference numeral 400. The system 400 provides early warning of contamination of water distribution systems. The contamination can be unauthorized contamination or accidental contamination. A system for the detection of contaminates of a fluid in a water distribution system by one of the Applicants, John F. Cooper, is shown in U.S. patent application Ser. No. 10/797, 986, filed Mar. 11, 2004, titled Detection of Contamination of Municipal Water Distribution systems, and published as United States Published Patent Application No. 2004/0197922 on Oct. 7, 2000. U.S. patent application Ser. No. 10/797,986 filed Mar. 11, 2004, titled Detection of Contamination of Municipal Water Distribution systems, and published as United States Published Patent Application No. 2004/0197922 on Oct. 7, 2000, is incorporated herein by this reference.

The system 400 includes an array of autonomous sensors/communicators 401 that are exposed to the water flow 402, from a water source 408, in pipes 403, comprising the treated (e.g., chlorinated, filtered) water municipal distribution system. The array of autonomous sensors 401 detects the loss of chlorination shield upon introduction of non-specific biological or chemical reducing agents 404 into the water 402. Each sensor communicates by emitting acoustic signal burst 409, using the pipes 403 as wave-guides or channels. The preexisting Supervisory Control and Data Acquisition Systems (SCADAS) 405 receive the signal 409 and communicate by radio 406 to water management 407 where appropriate action can be taken.

The sensors 401 communicate by emitting acoustic signal bursts 409, using the pipes 403 as wave-guides or channels. The Supervisory Control and Data Acquisition Systems (SCADAS) 405 receives the signal 409 and communicates by radio 406 to water management 407. The system 400 can be installed in existing pipes through standard procedures. In one embodiment only micrometer-thick layers of platinum are required. The sensor array 401 senses a drop in the oxidation potential of the water when a reducible chemical or biological substance is introduced and tends to neutralize or fully neutralizes the chlorination and communicates such a drop in potential by generating and transmitting an acoustic signal through the water 402 using the water-filled pipes 403 as wave guides and the water as the acoustic medium. The signal (e.g., a 32 bit binary code) is transmitted to pre-existing monitoring sites or Supervisory Control and Data Acquisition systems commonly called "SCADA's" (SCADA's) that are linked to water management or other process control. Each system is wireless and autonomous, being powered by a primary battery, micro fuel cell, or a secondary battery trickle charged by a thermoelectric device, solar cell, or a water-powered generator. The system 400 detects gross biological or chemical contamination, or defeat of the chlorination shield using a reducing agent (e.g., glucose, ascorbate, thiosulfate, hyposulfite, or ferrocyanide, and many other common reducing agents) preliminary to the introduction of biological or chemical agent that might be destroyed by the ca. 1 ppm ambient chlorine or chlorine-equivalent concentration.

In addition to the oxidation potential and pH sensing, the system 400 has applicability and use for: elemental chlorine, chloramines, oxidative oxy-halogen compounds, ozone, oxygen, peroxydisulfate, peroxymonosulfate; strong reducing agents including hyposulfite, thiosulfate, ferrocyanide, sulfide, $H_2S$; and specific ions and solid/liquid dispersions of cyanide, selenium, lead, mercury and arsenic containing compounds; specific nerve and blistering agents including but not necessarily limited to VX, Lewisite, G-agents, phosgene, and mustard gases; and radiological sources including actinides and radioactive isotopes of iodine, cesium, strontium, thorium and cobalt. The sensors 401 may include specific sensors for biological materials, biochemicals or live, dead or sporulated bacteriological, viral or microbial organisms. The sensors 401 are emplaced on autonomous sensor/communicator platforms consisting of sensors, energy storage, microprocessor units, and acoustic signal generators. The energy storage unit is comprised of batteries, primary or secondary, in combination with power generation devices based on thermoelectric generators, hydraulic generators, fuel cells, solar, or wind converters. The system 400 can also be used in non-water based applications wherein the combination of sensor and communicator may be applied to oils, molten salts, gases, and liquid metals, or other media capable of sustaining acoustic signals within a conduit or pipe.

Figure 5:
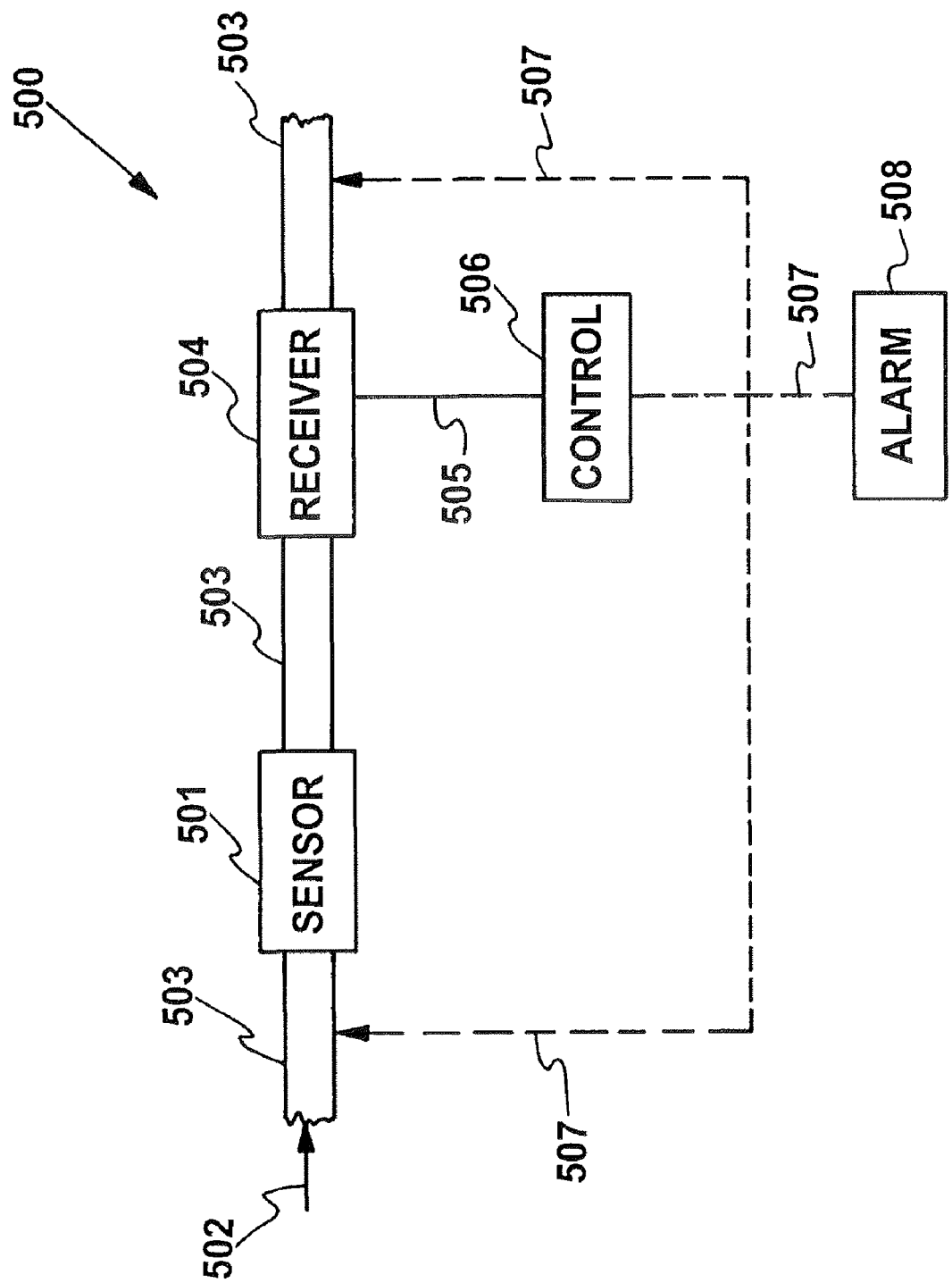
FIG. 5 illustrates another embodiment of a system constructed in accordance with the present invention.

Referring now to FIG. 5, another embodiment of a system constructed in accordance with the present invention is illustrated. This embodiment is designated generally by the reference numeral 500. The system 500 provides communicate using a network of sensors 501 to a control to any pipe network that distributes a fluid. The fluid can be water, oil, gas, an aqueous solution, or a chemical mixture.

The system 500 utilizes a sensor 501 that is exposed to a fluid 502 in a pipe 503. The sensor 501 communicates with receiver 504. The receiver 504 communicates by communication system 505 to control 506. The control 505 can take appropriate action in response to the information obtained by the sensor 501.

The communication system 505 provides a signal to control 506. The control is connected to the pipeline 303 by connection 507. The control 506 can take appropriate action in response to the information obtained by the sensor 501 and transferred to the control 506 through a connection 505.

In one embodiment, the sensor 501 senses physical properties of the fluid. In another embodiment, the sensor 501 senses temperature or density or thermal conductivity or electrical resistivity or sound speed or viscosity or optical absorbance or scattering of the fluid. In another embodiment, the sensor 501 senses chemical properties of the fluid. In another embodiment, the sensor 501 senses specific ion concentration or specific molecular composition of the fluid. In another embodiment, the sensor 501 senses biological, biochemical or chemical contaminants in the fluid. In another embodiment, the sensor 501 senses biochemicals or sporulated bacteria or viral organisms or microbial organisms in the fluid. In another embodiment, the sensor 501 senses elemental chlorine or oxidative oxy-halogen compounds or ozone or oxygen or peroxydisulfate or strong reducing agents or hyposulfite or thiosulfate or sulfide or $H_2S$ or cyanide or selenium or lead sensor or mercury or arsenic or nerve agents or blistering or VX or Lewisite or G-agents or phosgene or gas or actinides or radioactive isotopes or radioactive iodine or radioactive cesium or radioactive strontium sensor or thorium or radioactive cobalt or radioactive thorium in the fluid.

The central control unit 506 is connected to the receiver 504 by connection 505 and the sensor 510 communicates with the central control unit for quality assurance and process control feedback. Power is supplied to the receiver 504 by an internal battery, fuel cell, hydraulic electric generator, or thermoelectric generator. Power is supplied to the sensor 501 by an internal battery, fuel cell, hydraulic electric generator, or thermoelectric generator.

Figure 6:
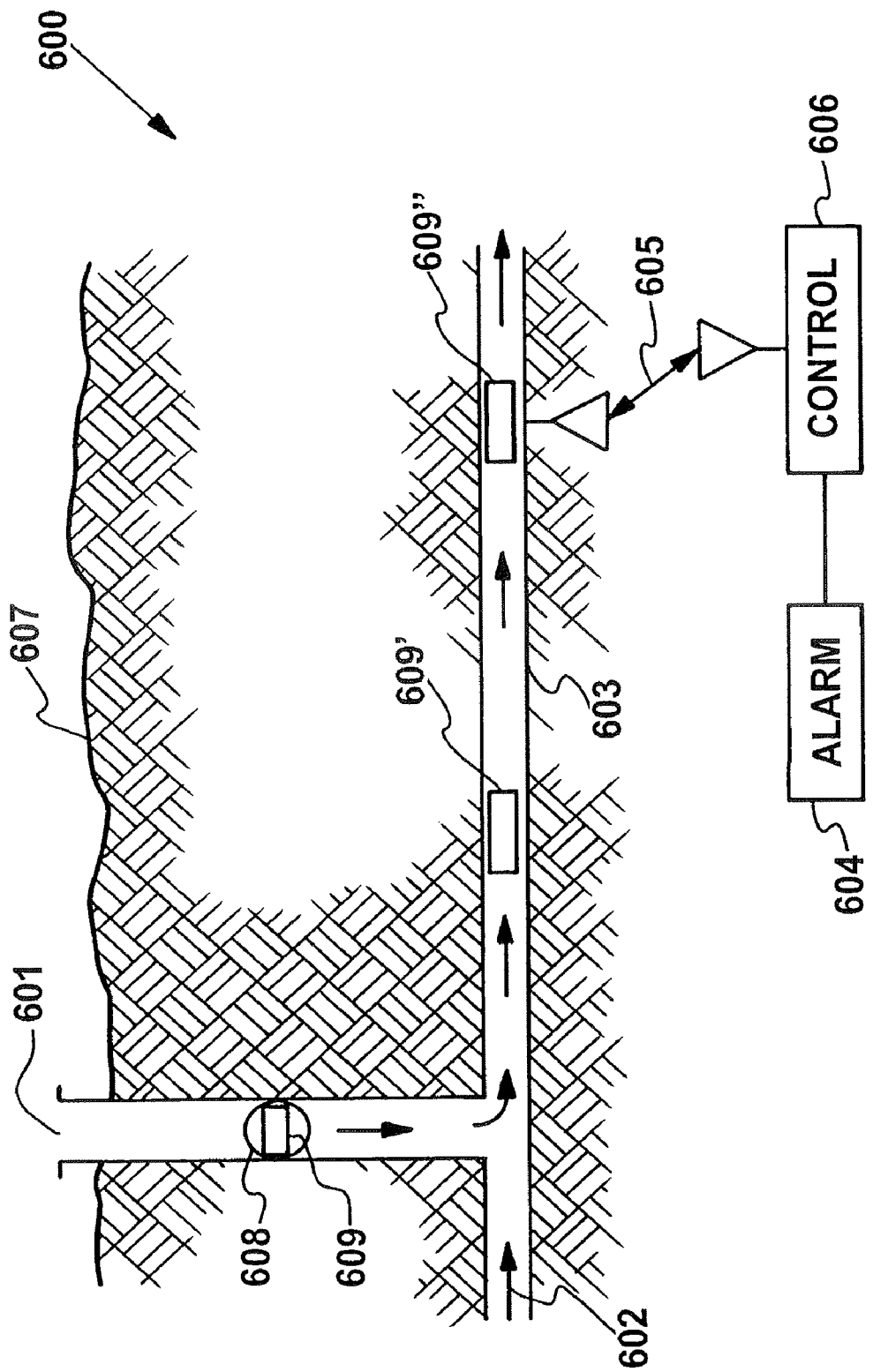
FIG. 6 illustrates another embodiment of a system for introducing a warning unit such as sensor or a receiver into a pipeline.

Referring now to FIG. 6, an embodiment of another system for introducing a warning unit 609 such as a sensor 609' or a receiver 609" into a pipeline 603 buried below the surface 607 using an installation robot 608 is illustrated. The system is designated generally by the reference numeral 600. The system 600 provides an inexpensive method of installing a warning unit such as water monitoring sensors, transmitters, and/or receivers into a water distribution network.

The system 600 uses existing water distribution networks and enables a warning unit 609 such as a sensor/transmitter or receiver to be installed into a buried pipeline 603 without excavation. The system 600 can be used in installing water quality monitoring sensors and receiver into water pipes buried below the surface 607. The system 600 can also be used as a service connection for any purpose. The system 600 can be used to install connections in any buried fluid distribution system without excavation.

The system 600 installs sensor 609' and receiver 609" using the robot 608 that is introduced into the pipeline 603 through an existing standard connection 601. The sensor 609' and receiver 609" are installed so that they are exposed to the fluid 602 in the pipeline 603. The sensor 609' communicates with receiver 609" through acoustic transmission. The receiver 609" communicates by communication system 605 to control 606. The control 606 can take appropriate action in response to the information obtained by the sensor 609'. For example, the control 606 can sound alarm 604 upon receiving an alarm signal. Power can provided to the sensor 609', receiver 609", communication system 605, control 606, and/or alarm 604 by internal batteries or fuel cells or other source.

The installation robot 608 is introduced to the pipeline 603 through any standard connection 601. The sensor 609' and receiver 609" are introduced into the pipe 603 through the connections 601 with the installation robot 608. Robot system for installation of devices into pipelines are know and available. For example, systems are described in the following patents:

U.S. Pat. No. 6,688,337 for an apparatus and method for the robotic repairing of an underground pipe junction with a flexible patch mechanism, issued Feb. 10, 2004 to Robert M. Ward, shows a method of using a robot mechanism 100, support cage 116 and patch 118 to perform a patching operation. The first step requires identifying the lateral service line 126 requiring a patch 118 after the installation of a liner in the main pipeline 104. Identification may be done visually by an operator or remotely using a video camera or other sensing device. Once the lateral service line 126 is identified, access is provided to the lateral service line 126 by drilling a hole through the liner with the use of a remotely controlled drill attached to a robotic apparatus, which is pulled through the main pipeline 104. If the lateral line 126 overextends into the main pipeline 104, the excess can be trimmed with a robotic grinder or the like, and U.S. Pat. No. 6,678,954 for Methods to set a hollow device into and to retrieve said hollow device from a flow pipe, issued Jan. 20, 2004 to Alcino Resende De Almedia shows method of setting a hollow device into an undersea flow pipe having a flow of fluids flowing in it, the method comprising: inserting at least one stop means into a position where said hollow device is to operate; first inserting said hollow device ahead of a driving means into an end of said flow pipe located upstream of a point where said hollow device should operate; allowing said driving means to be urged by said flow flowing in said flow pipe, thereby displacing said hollow device along said flow pipe; allowing said at least one stop means to halt the displacement of said hollow device, thereby setting said hollow device into its operating position; and allowing said driving means to pass through a passage into said hollow device, urged by a pressure exerted by said flow.

The disclosures of U.S. Pat. No. 6,678,954 and U.S. Pat. No. 6,678,954 are incorporated herein by this reference.

The system 600 can be used as a service connection for any purpose. The system 600 can be used for installing sensors and receiver into buried water pipes. The sensor 609' and receiver 609" are introduced into a pipeline network by the robot 601 and fixed to the inside of the pipe 603 by a mechanical fastener installed by the robot 601.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An apparatus for providing a warning of unauthorized contamination or accidental contamination by sensing and communicating in an existing buried water pipeline without excavation wherein water is in the water pipeline and wherein a fire hydrant is connected to the existing buried water pipeline, comprising:
   a discrete sensor unit that senses at least one property of the fluid to provide a warning of unauthorized contamination or accidental contamination and produces in the water pipeline a warning signal of unauthorized contamination or accidental contamination related to said property, said property comprising a biological property or a chemical property,
   means for introducing said discrete sensor unit into the water pipeline through the fire hydrant,
   a discrete receiver unit for receiving said warning signal related to said property,
   means for introducing said discrete receiver unit into the water pipeline through the fire hydrant,
   a control, said control producing an output function that provides a warning of unauthorized contamination or accidental contamination, and
   a communication system for transmission of said signal related to said property warning of unauthorized contamination or accidental contamination, said communication system transmitting said signal related to said property warning of unauthorized contamination or accidental contamination from said receiver to said control.

2. The apparatus for providing a warning of unauthorized contamination or accidental contamination by sensing and communicating in an existing buried water pipeline without excavation of claim 1 wherein said means for introducing said discrete sensor unit into the water pipeline through the fire hydrant is a tether that is attached to said discrete sensor unit and that extends through the fire hydrant.

3. The apparatus for providing a warning of unauthorized contamination or accidental contamination by sensing and communicating in an existing buried water pipeline without excavation of claim 1 wherein said means for introducing said discrete sensor unit into the water pipeline through the fire hydrant is a tether comprised of a flattened tape of metal, a steel cable, or a polymer cable that is attached to said discrete sensor unit and that extends through the fire hydrant.

4. The apparatus for providing a warning of unauthorized contamination or accidental contamination by sensing and communicating in an existing buried water pipeline without excavation of claim 1 wherein said discrete sensor unit produces acoustic pulses with time between acoustic pulses and wherein said warning signal relating to said property is related to said time between said acoustic pulses.

5. A method of providing a warning of unauthorized contamination or accidental contamination by sensing and communicating in an existing buried water pipeline containing water, wherein a fire hydrant is connected to the existing buried water pipeline, comprising the steps of:
providing a discrete sensor unit for sensing information about at least one property of the water, said at least one property comprising a biological property or a chemical property that indicates unauthorized contamination or accidental contamination of the water, wherein said discrete sensor unit produces a warning signal upon sensing the unauthorized contamination or accidental contamination of the water;
introducing said discrete sensor unit into the water pipeline through the fire hydrant;
producing an acoustic warning signal in the water in the water pipeline containing said warning signal of unauthorized contamination or accidental contamination of the water;
transmitting said warning signal of unauthorized contamination or accidental contamination of the water through the water in the water pipeline;
providing a discrete receiver unit for receiving said warning signal of unauthorized contamination or accidental contamination of the water;
introducing said discrete receiver unit into the water pipeline through the fire hydrant;
receiving said warning signal of unauthorized contamination or accidental contamination of the water from the water in the water pipeline;
communicating said warning signal of unauthorized contamination or accidental contamination of the water from said discrete receiver unit to a control; and
using said control for taking action based upon said warning signal of unauthorized contamination or accidental contamination of the water.

6. The method of providing a warning of unauthorized contamination or accidental contamination by sensing and communicating in a an existing buried water pipeline of claim 5 wherein said step of introducing said discrete sensor unit into the water pipeline through a fire hydrant includes using a tether to introduce discrete sensor unit into the water pipeline through a fire hydrant.

7. The method of providing a warning of unauthorized contamination or accidental contamination by sensing and communicating in an existing buried water pipeline of claim 5 wherein said step of introducing said discrete sensor into the water pipeline through a fire hydrant includes using a tether comprised of a flattened tape of metal, a steel cable, or a polymer cable to introduce said discrete sensor unit into the water pipeline through a fire hydrant.

* * * * *